US005310444A

United States Patent [19]

Groenebaum

[11] Patent Number: 5,310,444

[45] Date of Patent: May 10, 1994

[54] VENEER JOINING MACHINE

[75] Inventor: Theo Groenebaum, Rietberg, Fed. Rep. of Germany

[73] Assignee: Heinrich Kuper GmbH & Co. KG, Reitberg, Fed. Rep. of Germany

[21] Appl. No.: 954,434

[22] Filed: Sep. 30, 1992

Related U.S. Application Data

[63] Continuation of Ser. No. 517,379, May 1, 1990, abandoned.

[30] Foreign Application Priority Data

May 2, 1989 [DE] Fed. Rep. of Germany ... 8905533[U]

[51] Int. Cl.[5] .......... B32B 31/04

[52] U.S. Cl. .......... 156/544; 156/543; 492/2

[58] Field of Search .......... 156/362, 544, 546, 543, 156/580, 582, 583.1; 492/2, 4, 5

[56] References Cited

U.S. PATENT DOCUMENTS

| | | | |
|---|---|---|---|
| 2,604,128 | 7/1952 | Dick et al. | 144/246 |
| 2,739,628 | 3/1956 | Kok | 156/362 |
| 4,099,487 | 7/1978 | Wouters | 29/116.1 |
| 4,619,728 | 10/1986 | Brink | 156/583.1 |
| 4,856,154 | 8/1989 | Nikulainen et al. | 29/116.1 |

FOREIGN PATENT DOCUMENTS

| | | |
|---|---|---|
| 949433 | 9/1956 | Fed. Rep. of Germany . |
| 1152527 | 8/1963 | Fed. Rep. of Germany . |
| 3409178 | 11/1984 | Fed. Rep. of Germany . |
| 429121 | 7/1967 | Switzerland . |

*Primary Examiner*—David A. Simmons
*Assistant Examiner*—J. Sells
*Attorney, Agent, or Firm*—Spensley Horn Jubas & Lubitz

[57] ABSTRACT

The invention relates to a veneer joining machine comprising a contact pressure pad having arranged therein a counterpressure roll having an outer tube which is held relative to an inner drive shaft at a variable distance as a jacket whose surface is even with a surface of said contact pressure pad or is slightly projecting with respect thereto. This arrangement offers the advantage that the contact pressure pad sensitively responds to the surface of the adjacent veneers so as to press the same and to activate the gluing thereof for butt gluing.

12 Claims, 2 Drawing Sheets

VENEER JOINING MACHINE

This is a continuation of U.S. patent application Ser. No. 07/517,379 filed on May 1, 1990 now abandoned.

BACKGROUND OF THE INVENTION

1. Field of the Invention

The present invention relates to a veneer joining machine comprising transporting means supported in a machine frame, as well as a contact pressure pad which is used for butt joining end edges of adjacent veneers and is displaceably arranged in a direction perpendicular thereto and which includes heating means.

2. Description of the Prior Art

With joining machines of this type it is known that the feed rolls by which the incoming veneers are pressed into the machine and then against the rear edge of a preceding veneer sheet are rotatably supported on a lower stationary table. It is also known that a counterpressure roll, or the like, is arranged in the upper part of the machine to ensure a sufficient advance of the incoming veneer.

As for the conventional rigid supporting of the upper counterpressure roll, the inaccurate adaptation of the distance of the two opposite rolls within the thickness tolerances of the veneers is disadvantageous. As a result, the veneers are often conveyed in an incomplete and irregular way or are even damaged.

SUMMARY OF THE INVENTION

It is an object of this invention to equip a veneer joining machine with an upper counterpressure roll which elastically touches the surface of the incoming veneer with its circumference and thus avoids the drawbacks of known machines. The support of such a counterpressure roll inside a vertically displaceable contact pressure pad is to be improved such that the latter sensitively responds to the surface of the adjacent veneers so as to press the same and to activate the gluing thereof for butt gluing.

With a veneer joining machine comprising transporting means supported in a machine frame, as well as a contact pressure pad which is used for butt joining end edges of adjacent veneers and is displaceably arranged in a direction perpendicular thereto and which includes heating means, this object according to an embodiment of the invention is attained by the features that the contact pressure pad has arranged therein a counterpressure roll including an outer tube which is frictionally held relative to an inner drive shaft at a variable distance as a jacket whose surface is even with the surface of the contact pressure pad or is slightly projecting with respect thereto.

With such a construction the spacing of the surface (jacket) of the counterpressure roll is thus variable relative to the inner drive shaft within certain limits, so that the surface sensitively responds to different thicknesses of incoming veneers.

In the counterpressure roll a means for transmitting the circumferential force from the drive shaft to the outer tube is preferably provided between the inner drive shaft and the outer tube as the jacket.

In a preferred embodiment two longitudinal grooves which extend parallel to the longitudinal side of the tube and are opposite each other in mirror-symmetrical fashion are provided on the inner side of the tube, and the drive shaft has through holes through which a carrier pin is respectively inserted whose tip engages at least one longitudinal groove.

Other features will become apparent from the subclaims.

The scope of protection does not only encompass the individual features, but also the combination thereof.

DESCRIPTION OF THE DRAWINGS

The present invention shall now be described with the help of an embodiment with reference to the accompanying drawing in which.

Figure 1:
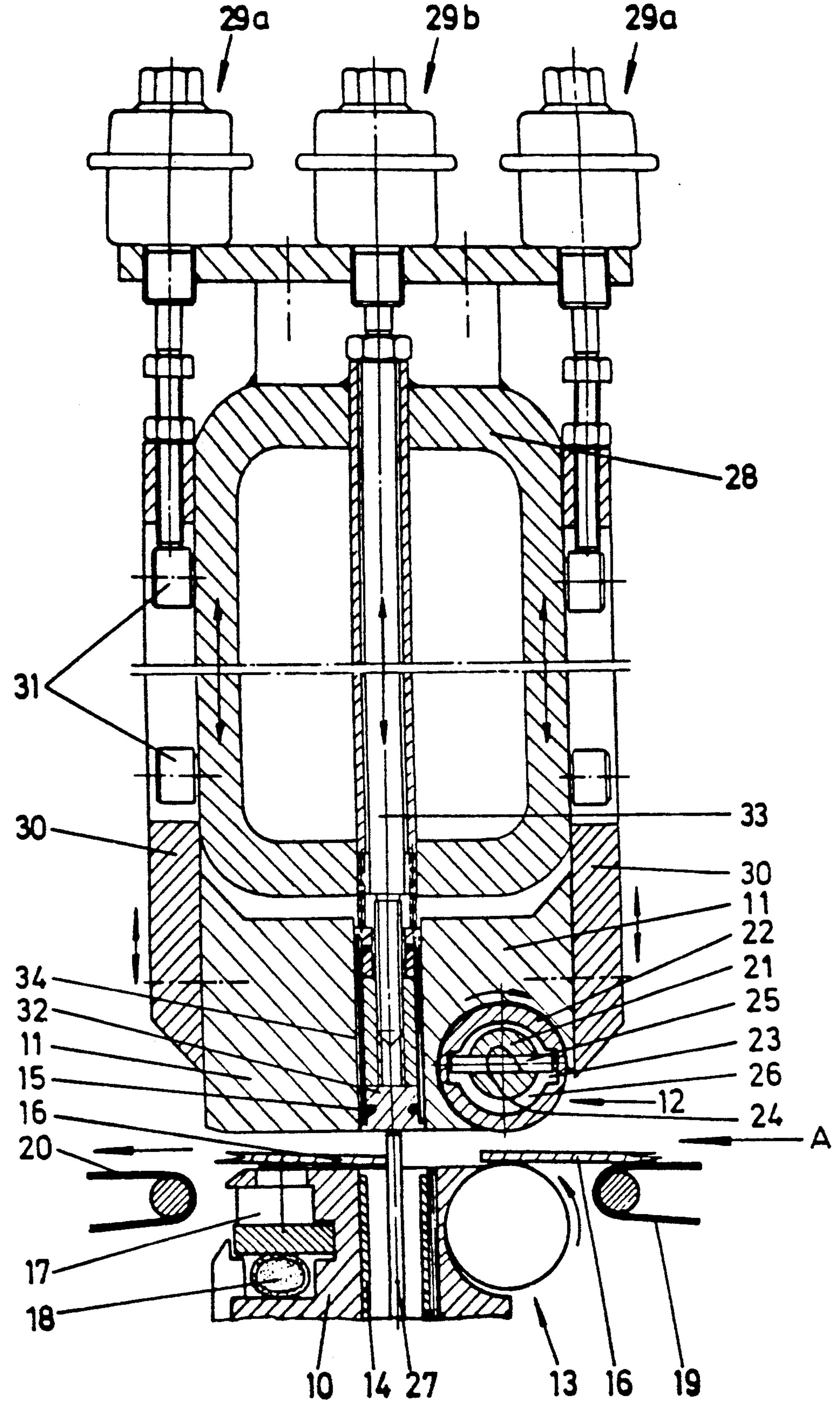
FIG. 1 is a partial sectional side view of the working area of an apparatus for joining veneers with a counterpressure roll of an embodiment of the invention.
Figure 3:
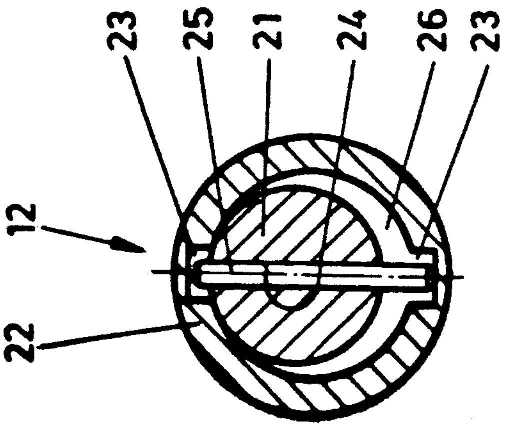
FIG. 3 a section through the counterpressure roll according to line III—III in FIG. 2.

An apparatus for joining veneers comprises a lower stationary table (10) and an upper contact pressure pad (11). At the lead-in side A a counterpressure roll (12) is supported in/on the upper contact pressure pad (11)—it may also be supported in/on a profile tube (28) arranged thereabove—and a transporting and pressing roll (13) rests on the table (10). This transporting roll (13) is constructed in the known and normal way, so that a detailed description is not necessary. The contact pressure pad (11) is movable in the vertical direction so as to convey or clamp a veneer (16) introduced in the transportation direction A.

In the center portion the table (10) and the contact pressure pad (11) respectively comprise a heating means (14, 15). These heating means are also vertically movable, either alone or together, so that in the end edge area of the adjacent veneers (16) these means can be brought into contact with a veneer sheet (16) to carry out gluing by means of pressure and heat.

Brake pads (17) which can be operated via a pressure means (18) to hold or brake the veneer (16) are moreover supported in the lead-out portion of the table (10).

A lead-in conveyor (19) by which the veneer strips to be glued are supplied terminates at the lead-in side A of the table (10). By analogy, the lead-out side of the table (10) is followed by a lead-out conveyor (20) for transporting the veneer sheets glued to one another.

The transporting and pressing roll (13) is supported on the table (10) and driven by means of a drive (not shown).

The whole counterpressure roll (12) is formed by a plurality of individual rolls (22) which are individually supported one after the other in spaced relationship with each other about a central drive shaft (21). The shaft (21) is here connected (not shown) to a drive, so that it can be rotated clockwise, as shown.

Each individual pressure roll (22) is a tube of circular cross-section from the inner surface of which two longitudinal grooves (23) extend. These longitudinal grooves are in parallel with the longitudinal axis of the tube and opposite each other in mirror-symmetrical fashion and face outwards towards the outer tube surface over the entire tube length. The shaft (21) is here arranged in the tube. On the one hand, it is supported at the front side (not shown); on the other, it is connected at the front side to a drive (also not shown). Over its length which is respectively surrounded by the circular tube, the shaft comprises two through holes (24) which extend in spaced relationship with each other relative to the longitudinal axis of the shaft at a right angle. Carrier pins (25) whose length is slightly smaller than the distance from one longitudinal groove bottom to the other longitudinal groove bottom are inserted through these holes (24) with a play.

The width of the two opposite longitudinal grooves (23) is greater (about two to three times) than the diameter of the carrier pin (25). Since the diameter of the shaft (21) is smaller than the inner diameter of the roll (22), a uniform clearance (26) which annularly extends in the radial and axial directions between the outer shaft surface and the inner roll surface is obtained when shaft (21) and roll (22) are coaxially positioned. This has the effect that when the contact pressure pad (11) is moved downwards and a veneer sheet is thus transported by pressing roll (13) and counterpressure roll (12) for contact with a preceding veneer sheet held by means of a brake pad (17), the individual pressure rolls (22) of the counterpressure roll (12) can be individually adapted to the different veneer thicknesses along a veneer sheet although they are jointly arranged on the central drive shaft (21). This ensures a continuous feed of and pressure on the veneer sheet for bringing the same into contact with a preceding sheet; with a veneer thickness which is on the whole greater than another veneer thickness, the counterpressure roll (12) is correspondingly arranged at a higher level.

Figure 2:
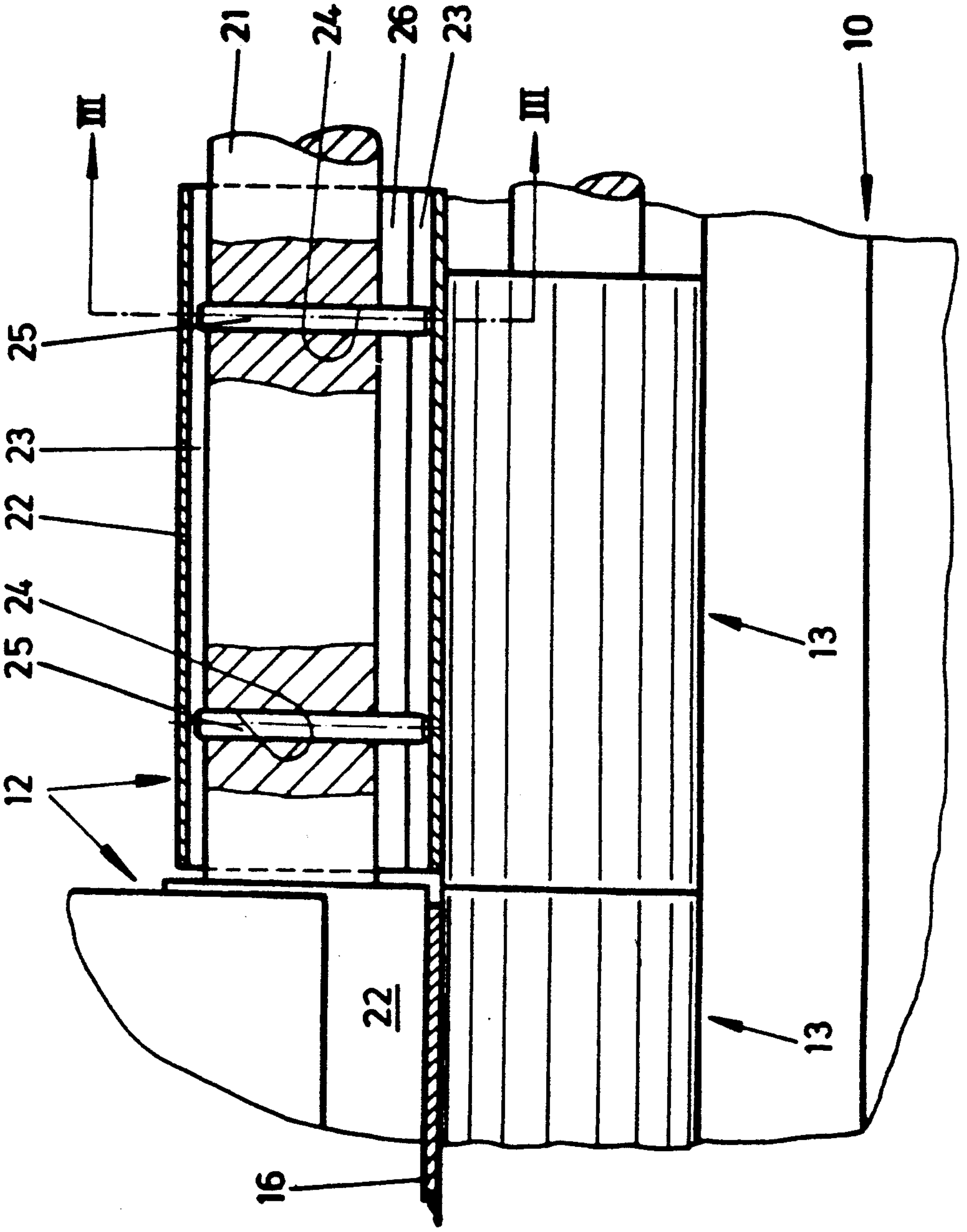
FIG. 2 a partial longitudinal section through a counterpressure roll with a transporting and pressing roll positioned thereunder.

As a result of the individual adaptation to different veneer thicknesses along a veneer sheet, the distance between an individual pressure roll (22) which is not in contact with a veneer sheet, and the transporting and pressing roll (13) positioned thereunder becomes zero; the upper roll (12) rests on the lower one (13). Both members roll on each other (see FIG. 2).

The apparatus for joining veneers operates in the following way:

In the left area of the apparatus shown in FIG. 1 a broad pre-glued veneer sheet (16) is introduced. Additional stop pins (27) which are supported on the table (10) can here be moved upwards to exactly position the veneer sheet (16) and its trailing edge, respectively. A veneer which, after the stop pins (27) have been removed from the transportation path, is brought into contact with the already present veneer sheet (10) held by brake pads (17) is subsequently supplied by the lead-in conveyor (19) and the transporting and pressing roll (13). A horizontal passageway in which the subsequent veneer is firmly pressed by transporting and pressing roll (13) and counterpressure roll (12) against the preceding veneer sheet is here formed between the heating means. The upper and lower heating means (14, 15) are then activated with pressure and heat to spread the adhesive which has been applied during the supply of the new veneer to the adhesive edge thereof, over the other veneer sheet (16). The necessary contact pressure between the veneers is produced and maintained by the transporting and pressing roll (13) and the associated counterpressure roll (12). After a predetermined reaction time the joined veneer sheets (16) are released and transported away.

The movability of the heating means (14, 15) of the contact pressure pad (11) and the table (10) and of the profile tube (28) which is arranged thereabove and approximately corresponds to the working width of the apparatus can be achieved in the known way by means of driving elements, such as pressure medium cylinders (29) and/or connecting rods (not shown) and/or racks (also not shown), or the like.

In the embodiment shown in FIG. 1, the profile tube (28) which extends in the transverse direction is supported such that it is vertically adjustable via a lifting means (not shown) within a wide range. This profile tube (28) has arranged next thereto lateral guide strips (30) which are guided by means of rolls (31) supported rotatably and laterally on the profile tube (28), and which are vertically adjustable by means of lateral pressure medium cylinders (29 a) within a narrow range. At their lower ends said guide strips (30) hold the block-shaped contact pressure pad (11) in which, as has already been described, the counterpressure roll (12) is supported eccentrically at the lead-in side.

With a great force this contact pressure pad (11) clamps both the incoming veneer and the veneer sheet that has already passed through onto the table (10), with the stop pins (27) being moved downwards and the adjacent edges of the veneer and the veneer sheet, respectively, being now close to each other. The brake pad (17) has thereby moved downwards as well.

The block-shaped contact pressure pad has a centrical and slot-like opening (34) in which a heating plate (32) is separately supported. This heating plate is vertically displaceable by means of a lifting rod (33) having a separately controlled lifting cylinder (29 *b*), or the like.

For butt gluing the adjacent end edges of the veneer and the veneer sheet which are now in contact with each other, the small heating plate (32) presses against this end edge portion, so that the gluing operation is carried out under a certain pressure and with a certain heat.

For the further transportation of the veneer sheet the contact pressure pad (11) moves upwards and uncovers the lead-in gap.

The contact pressure pad (11) may be firmly screwed to the two guide strips (30); these two parts may however also be integral.

In another embodiment the contact pressure pad (11) may be divided at its center in the longitudinal direction and thus be of a two-part construction and centrically receive the heating means thereinbetween. The vertical movement of each part of the contact pressure pad (11) with the respective guide strip (30) can be controlled differently.

Over the width of the entire joining machine a multitude of short contact pressure pads (11) are arranged next to one another at both sides of the central heating means.

I claim:

1. A veneer joining machine comprising transporting means, such as rolls, which are supported in a machine frame and draw together veneers with their impact edges, as well as a contact pressure pad which is arranged in the area of the end faces of adjacent veneers to be butt-joined and includes heating means, characterized in that said contact pressure pad (11) has arranged therein a counterpressure roll (12) having an outer tube (22) which is held relative to an inner drive shaft (21) at a variable distance as a jacket whose surface is even with the surface of said contact pressure pad (11) or is slightly projecting with respect thereto, wherein two longitudinal grooves (23) which extend parallel to the longitudinal tube side and are opposite each other in mirror-symmetrical fashion are provided on the inner side of side tube (22), and that the drive shaft (21) disposed in said tube (22) comprises a plurality of through holes (24) which extend in spaced relationship with each other relative to the longitudinal shaft axis at a right angle and through which a carrier pin (25) is respectively inserted whose length is slightly smaller than the distance from one longitudinal groove bottom to the other longitudinal groove bottom.

2. The veneer joining machine according to claim 1, characterized in that the width of said two opposite longitudinal grooves (23) is greater than the diameter of said driving pin (25).

3. A veneer joining machine comprising transporting means, such as rolls, which are supported in a machine frame and draw together veneers with their impact edges, as well as a contact pressure pad which is arranged in the area of the end faces of adjacent veneers to be butt-joined and includes hearing means, characterized in that said contact pressure pad (11) has arranged therein a counterpressure roll (12) arranged to apply pressure on the veneers, the counterpressure roll having an outer tube (22) which is held relative to an inner drive shaft (21) at a variable distance as a jacket whose surface is even with the surface of said contact pressures pad (11) or is slightly projecting with respect thereto, wherein said counterpressure roll (12) is rotatably supported in a holding space eccentrically in said contact pressure pad (11) at the lead-in side.

4. A veneer joining machine comprising transporting means, such as rolls, which are supported in a machine frame and draw together veneers with their impact edges, as well as a contact pressure pad which is arranged in the area of the end faces of adjacent veneers to be butt-joined and includes hearing means, characterized in that said contact pressure pad (11) has arranged therein a counterpressure roll (12) arranged to apply pressure on the veneers, the counter pressure roll having an outer tube (22) which is held relative to an inner drive shaft (21) at a variable distance as a jacket whose surface is even with the surface of said contact pressures pad (11) or is slightly projecting with respect thereto, wherein said contact pressure pad (11) is provided with lateral guide strips (30) which are in abutment with a continuous cross profile (28) in said machine frame.

5. The veneer joining machine according to claim 4, characterized in that said guide strips (30) are movably supported with the aid of a lifting means (29 *a*).

6. The veneer joining machine according to claim 4, characterized in that said cross profile (28) is displaceably supported in said machine frame with the aid of a separate lifting means.

7. A veneer joining machine comprising transporting means, such as rolls, which are supported in a machine frame and draw together veneers with their impact edges, as well as a contact pressure pad which is arranged in the area of the end faces of adjacent veneers to be butt-joined and includes hearing means, characterized in that said contact pressure pad (11) has arranged therein a counterpressure roll (12) arranged to apply pressure on the veneers, the counterpressure roll having an outer tube (22) which is held relative to an inner drive shaft (21) at a variable distance as a jacket whose surface is even with the surface of said contact pressures pad (11) or is slightly projecting with respect thereto, wherein said contact pressure pad (11) comprises a central opening (34) in which a heating block (32) is displaceably supported in a resilient fashion.

8. The veneer joining machine according to claim 7, characterized in that said heating block (32) is supported such that it is vertically adjustable with the aid of a lifting means (29 *b*).

9. The veneer joining machine according to claim 7, characterized in that a stop pin (27) which is adapted to be moved downwards into said table is displaceably supported in the region of said heating block (32).

10. A veneer joining apparatus for joining together veneers, the apparatus comprising:

transporting rolls for drawing together end faces of veneers to be joined;

a contact pressure pad which is arranged in the area in which the end faces of veneers to be joined are drawn together; and a counterpressure roll arranged in the contact pressure pad and having a drive shaft and an outer tube disposed about the drive shaft and supported at a distance relative to the drive shaft, wherein the outer tube has an inner peripheral surface provided with two longitudinal grooves, and wherein the drive shaft is provided with a plurality of through holes disposed in spaced relationship with each other relative to the longitudinal axis of the drive shaft substantially at a right angle with respect to the longitudinal axis of the drive shaft, the apparatus further comprising a carrier pin disposed in each through hole, each carrier pin having a length smaller than the distance from one longitudinal groove bottom to the other 11. A veneer joining machine for joining veneers, comprising:

a machine frame;

rolls supported by the machine frame for drawing together the veneers;

said rolls including a counterpressure roll mounted in said machine frame adjacent the veneers, and heating means, said counterpressure roll having an inner drive shaft and an outer tube which is held relative tot eh inner drive shaft at a variable distance as a jacket whose surface is even with the surface of said contact pressure pad or is slightly projecting with respect thereto, wherein two longitudinal grooves which extend parallel to the longitudinal tube side and are opposite each other in mirror-symmetrical fashion are provided on the inner side of the tube, and wherein the inner drive shaft comprises a plurality of through holes which extend in spaced relationship with each other relative to the longitudinal shaft axis at a right angle and a respective carrier pin inserted in each through hole, each carrier pin having a length which is slightly smaller than the distance from one longitudinal groove bottom to the other longitudinal groove bottom.

12. A veneer joining apparatus for joining together veneers, the apparatus comprising:

transporting rolls for drawing together end faces of veneers to be joined;

a counterpressure roll arranged adjacent said veneers to be joined and having a drive shaft and an outer tube disposed about the drive shaft and supported at a distance relative to the drive shaft, wherein the outer tube has an inner peripheral surface provided with two longitudinal grooves, and wherein the drive shaft is provided with a plurality of through holes disposed in spaced relationship with each other relative to the longitudinal axis of the drive shaft substantially at a right angle with respect to the longitudinal axis of the drive shaft, the apparatus further comprising a carrier pin disposed in each through hole, each carrier pin having a length smaller than the distance from one longitudinal groove bottom to the other longitudinal groove bottom.

* * * * *